United States Patent
Tabata et al.

(10) Patent No.: US 6,869,575 B2
(45) Date of Patent: Mar. 22, 2005

(54) OZONIZER

(75) Inventors: Youichiro Tabata, Tokyo (JP); Yujiro Okihara, Tokyo (JP); Akaru Usui, Tokyo (JP); Hiromichi Komiya, Tokyo (JP); Yuji Ganryu, Tokyo (JP); Masaki Kuzumoto, Tokyo (JP); Noboru Wada, Tokyo (JP); Koji Ohta, Tokyo (JP); Shigenori Yagi, Tokyo (JP); Hirozoh Kanegae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 342 days.

(21) Appl. No.: 10/190,566

(22) Filed: Jul. 9, 2002

(65) Prior Publication Data

US 2003/0095900 A1 May 22, 2003

(30) Foreign Application Priority Data

Nov. 22, 2001 (JP) .......................... 2001-357862

(51) Int. Cl.⁷ .............................................. B01J 19/08
(52) U.S. Cl. ................. 422/186.2; 422/186.07
(58) Field of Search ........................ 422/186.2, 186.07

(56) References Cited

U.S. PATENT DOCUMENTS 5,932,180 A * 8/1999 Zhang et al. .......... 422/186.07
6,284,203 B1 * 9/2001 Tokutake et al. ...... 422/186.07

FOREIGN PATENT DOCUMENTS

| JP | 8-12304 | 11/1995 |
| JP | 2000-281318 | 10/2000 |

* cited by examiner

Primary Examiner—Kishor Mayekar
(74) Attorney, Agent, or Firm—Leydig, Voit & Mayer, Ltd.

(57) ABSTRACT

The ozonizer of this present invention is small in size, and capable of generating highly concentrated ozone with a high (generating) efficiency. A low voltage electrode includes a disc-shaped low voltage electrode main body facing a high voltage electrode and an extension at one side of the low voltage electrode main body, and the extensions are laminated in layers on a base via blocks, and a coolant inlet portion for supplying coolant to a coolant passage, a coolant outlet portion for exhausting coolant from the coolant passage, and an ozone gas outlet portion for exhausting ozone gas from the ozone gas passage pass through the extensions and the blocks, respectively, in a laminating direction of the discharge cells.

18 Claims, 19 Drawing Sheets

OZONIZER

This application is based on Application No. 2001-357862, filed in Japan on Nov. 11, 2001, the contents of which are hereby incorporated by reference.

BACKGROUND OF THE INVENTION

1. Field of the Invention

The present invention relates to an ozonizer in which an alternating high voltage is applied to a discharge gap between a high voltage electrode and a low voltage electrode to generate ozone gas.

2. Description of the Related Art

FIG. 25 is a cross sectional drawing of a conventional laminated ozonizer described in, for example, Japanese Patent Publication No. 3113885.

This conventional rectangular parallelopiped ozonizer comprises a base 1, discharge cells 2 laminated in a plurality of layers on the base 1, blocks 3 sandwiching low voltage electrodes 4 of the discharge cells 2 laminated at both sides of the base 1 and a number of fastening bolts 5 passing through the low voltage electrodes 4 and blocks 3, tip portions thereof screwing to integrate the base 1, the discharge cells 2 and the blocks 3.

The discharge cell 2 comprises a high voltage electrode 8, a dielectric 7 contacting both surfaces of the high voltage electrode and a low voltage electrode 4 facing the dielectric 7 via the discharge gap 6. The dielectric 7 is made of glass. The high voltage electrode 8 is made of a conductive sheet such as a stainless steel plate and the like and is connected to a feed terminal (not shown).

A number of spacers 9 are disposed in the discharge gap 6 at a predetermined interval. These spacers 9 comprise rigid bodies and, in FIG. 25, extend in a direction orthogonal to the page. A diameter dimension of the spacers 9 is smaller than a discharge gap length which is inevitably determined by fastening the ozonizer with the fastening bolts 5, and the spacers 9 "float" inside the discharge gap 6.

Moreover, in a case where the spacers in the discharge gap are elastic bodies, a diameter of the spacers is bigger than the discharge gap and the spacers are compressed a little.

The discharge gaps 6 are communicated with an ozone gas outlet portion 10 passing through respective end portions of the blocks 3, low voltage electrodes 4 and base 1 in a laminating direction of the discharge cells 2. A coolant passage 11 is formed in each low voltage electrode 4. An end portion of each coolant passage 11 is connected to a coolant outlet portion 12 passing through the blocks 3, low voltage electrodes 4 and base 1. The coolant outlet portion 12 is formed at a near side in the width direction of the ozonizer (the direction orthogonal to the surface of the page). Also, a coolant inlet portion connected to the coolant passages 11 (not shown) is formed at a far side in the width direction of the ozonizer.

Next, operation will be explained.

When an alternating high voltage is applied between the low voltage electrode 4 and the high voltage electrode 8, a dielectric barrier discharge is generated in the discharge gap 6 via the dielectric 7. Oxygen gas is introduced to the discharge gaps 6 from oxygen gas inlet portions (not shown) formed at both the near side and far side of the page so as to collide at a central portion and is dissociated to single oxygen atoms by this discharge and, at roughly the same time, a collision is induced between these oxygen atoms and other oxygen molecules and a three body collision is induced between these oxygen atoms, other oxygen molecules and a wall and the like and ozone gas is generated. By continuously supplying oxygen gas to the discharge gaps 6, the ozone gas generated by the discharge may be continuously derived as ozone gas from the ozone gas outlet 10.

An ozone generating efficiency derived from this discharge is normally, at most, 20%. That is to say, 80% of the discharge power heats the electrodes and is lost. Also, the generating efficiency of the ozone gas is dependent on the temperature of the electrode 4, 8 (strictly speaking, the temperature of the oxygen gas and the ozone gas in the discharge gap), and the lower the temperature of the electrode the higher the generating efficiency. Hence, the low voltage electrodes 4 are directly cooled with a coolant such as cooling water and the like, while a rise in gas temperature in the discharge gaps 6 may be suppressed by shortening the gap length of the discharge gap 6, and the ozone generating efficiency is increased by increasing the electron temperature, ozone decomposition is inhibited and, as a result, an efficient ozonizer capable of deriving highly concentrated ozone gas may be provided.

In this example, coolant flows from the coolant inlet portion to the coolant passages 11 in each of the low voltage electrodes 4 and is exhausted outside the ozonizer from the coolant outlet portion 12 and the low voltage electrodes 4 are thereby cooled.

In a conventional ozonizer of such a construction, the coolant outlet portion 12 and coolant inlet portion, and the ozone gas outlet portion 10 are formed separately at both sides of the ozonizer, and further, are formed passing through the separate blocks 3 at both sides of the ozonizer. Therefore, there are problems in that time is required to position respective through holes for forming the coolant outlet portion 12, the coolant inlet portion and the ozone gas outlet portion 10, and an assembly operation is time consuming.

Furthermore, the coolant outlet portion 12 and coolant inlet portion, and ozone gas outlet portion 10 are formed separately at both sides of the ozonizer, and there is a problem in that a size of the entire construction is enlarged.

Also, since integration of the base 1, the discharge cells 2 and the blocks 3 is performed by means of the plurality of fastening bolts 5 in both end portions of the ozonizer, the discharge cells 2 may be bent slightly into arc shapes the effect of which is large especially when the discharge gap length is short, 0.1 mm, and there is a problem in that the discharge gap length becomes non-uniform and highly concentrated ozone gas cannot be obtained.

Furthermore, the spacers 9 forming the discharge gap are rigid bodies and the diameter thereof is designed to be smaller than the discharge gap length which is inevitably determined when integrating the base 1, discharge cells 2 and blocks 3 using the fastening bolts 5; such a design entails the following problems.

That is, in a case where the discharge gap length is short and a highly concentrated ozone gas is generated, since a pressure loss of gas flowing across (along the direction of the page surface in FIG. 25) adjacent spacers 9 is much smaller than that of gas flowing along (the direction orthogonal to the page surface in FIG. 25) the spacers 9, much of the oxygen gas flows across adjacent spacers 9, and oxygen gas flowing in from the oxygen gas inlet portion flows toward the ozone gas outlet portion 10 in the end portion and a so-called "short-pass" phenomena occurs in the gas flow, and there is a problem in that an ozone gas generating efficiency is degraded.

In order for the oxygen gas to flow along the spacers 9 and eliminate the occurrence of a short-pass, it is understood that the pressure loss of gas flowing across adjacent spacers 9 must be approximately ten (10) or more the pressure loss of gas flowing along the spacers 9. For example, in the case of an ozonizer where the discharge gap length is 0.1 mm, the space between the spacer 9 and the discharge gap 6 must be very minuscule, the manufacture of the spacers 9 of such dimensions is nearly impossible and a short-pass cannot be avoided.

SUMMARY OF THE INVENTION

The present invention has been made in order to overcome the above mentioned problems and an object of the present invention is to provide an ozonizer capable of generating highly concentrated ozone with a high (generating) efficiency, and which is reduced in size and in which assembly work is simplified.

With the above objection in view, a ozonizer of the present invention includes a low voltage electrode having a disc-shaped low voltage electrode main body facing a high voltage electrode and an extension provided at one side of the low voltage electrode main body. The extensions are laminated in a plurality of layers on a base via a block. A coolant inlet portion for supplying coolant to the coolant passage, a coolant outlet portion for exhausting coolant from the coolant passage and an ozone gas outlet portion for exhausting ozone gas from the ozone gas passage are formed passing through the extensions and the block, respectively, in a laminating direction of the discharge cells.

Therefore, since the oxygen gas flows over at least a radial distance of the low voltage electrode main body and it is exposed under the alternating high voltage for predetermined time, ozone gas generating efficiency and the like is prevented from being degraded by a so-called "short-pass". Also, because the coolant inlet portion, the coolant outlet portion and the zone gas outlet portion are all gathered at one side of the ozonizer, the ozonizer may be made compact.

DETAILED DESCRIPTION OF THE PREFERRED EMBODIMENTS

Embodiment 1

Figure 1:
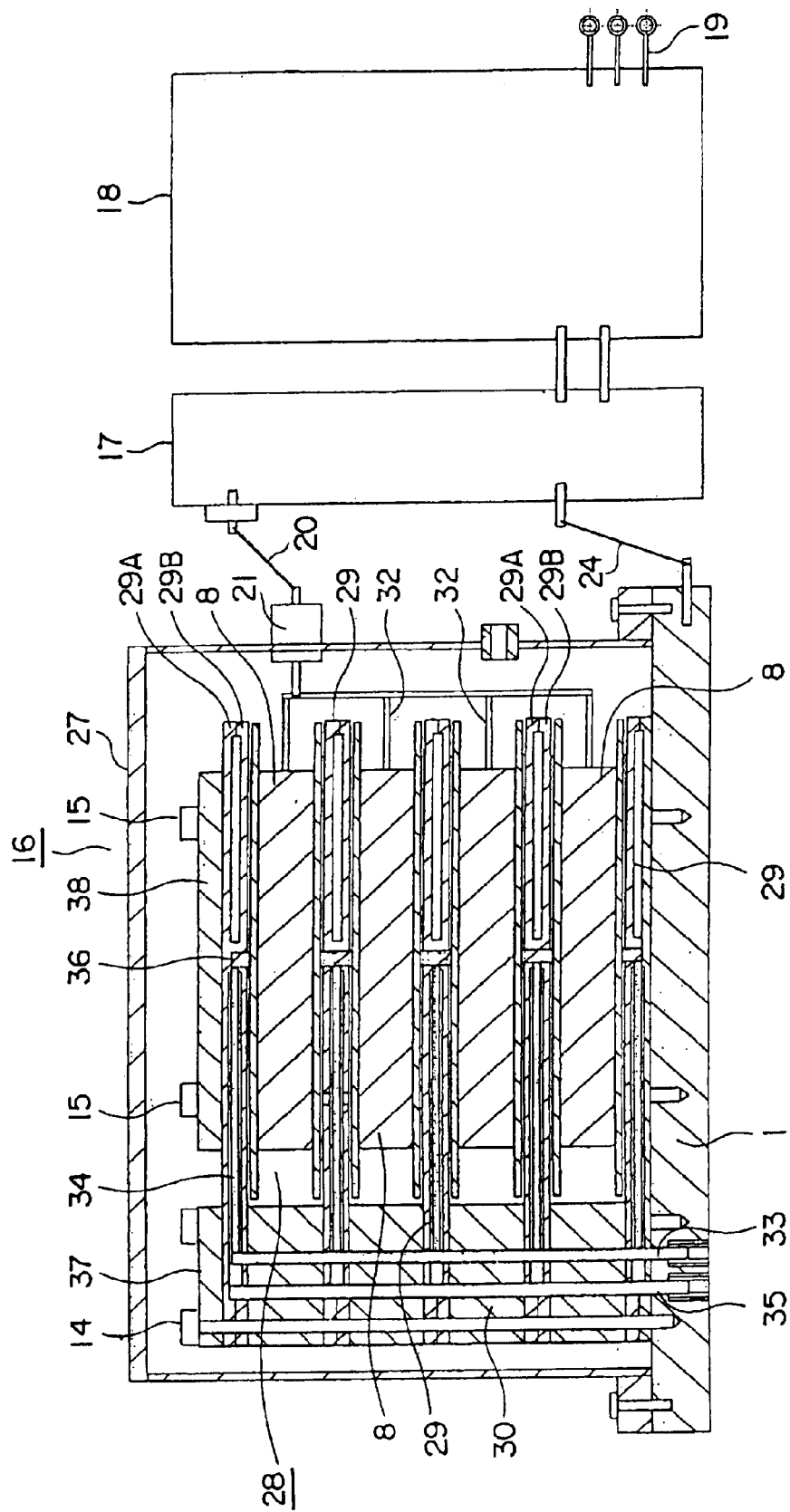
FIG. 1 is a diagram of an ozone generating apparatus including an ozonizer of Embodiment 1 of the present invention.

Below, an Embodiment 1 of the present invention will be explained, and members and regions which are similar or correspond to those in the conventional example will be denoted with similar reference numerals.

Figure 2:
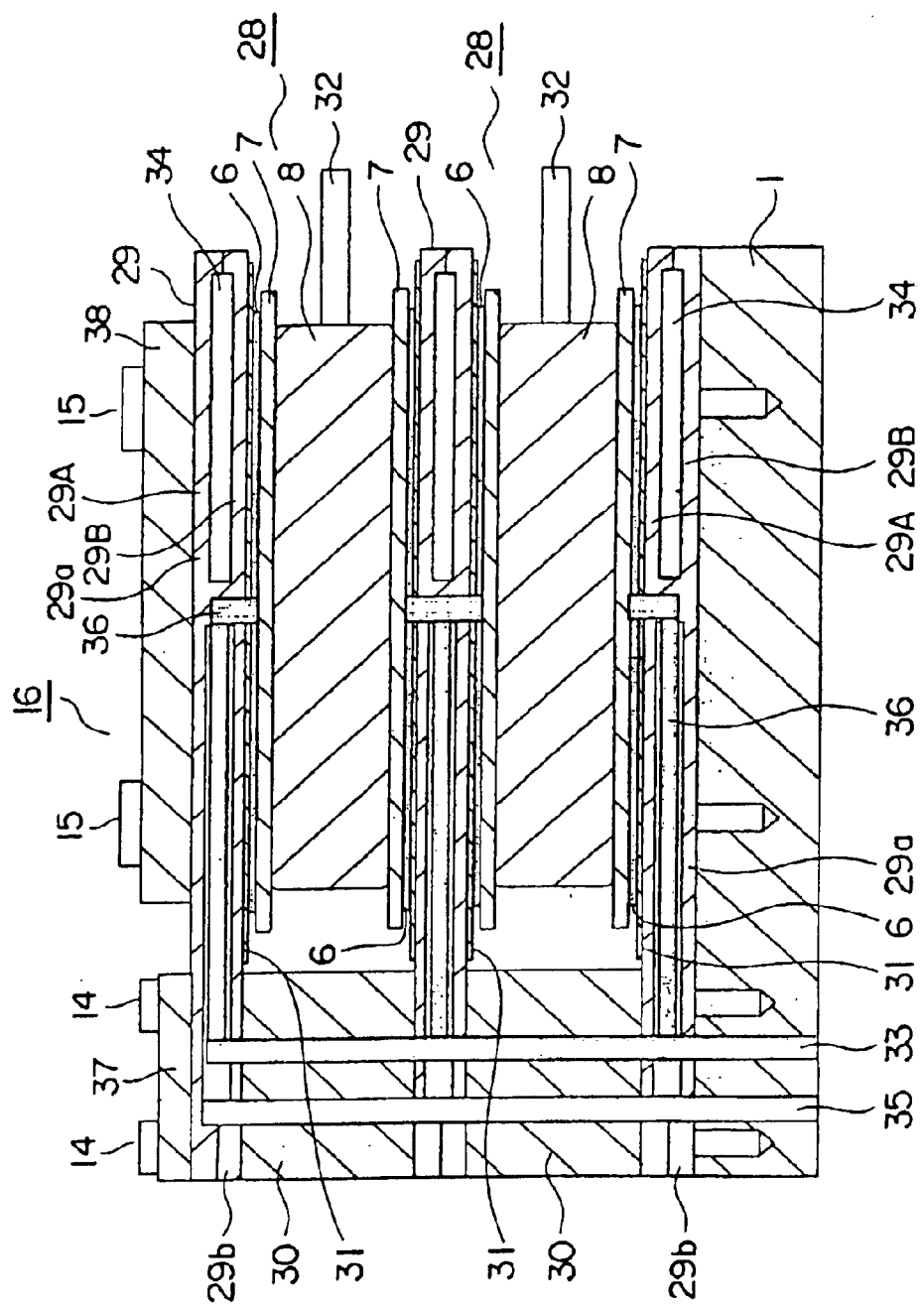
FIG. 2 is a diagram of an inner portion of the ozonizer of FIG. 1 with the cover removed.
Figure 3:
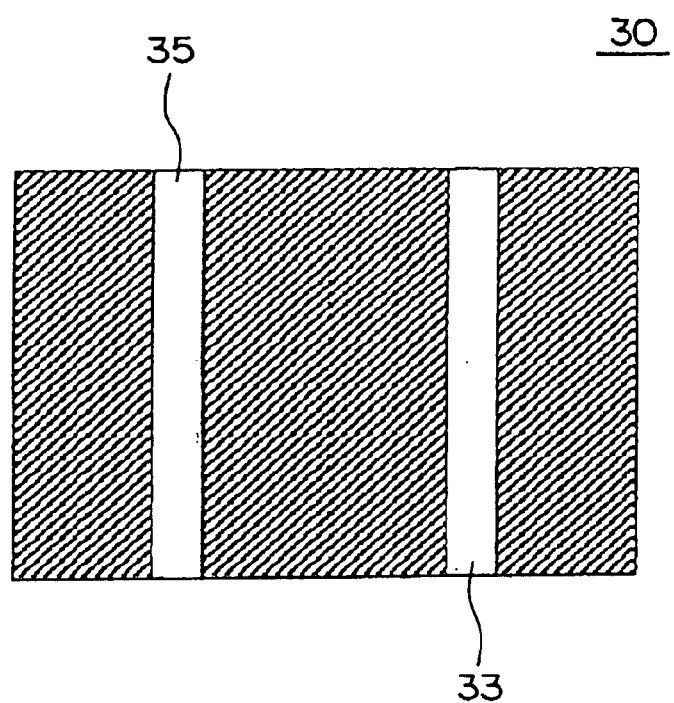
FIG. 3 is a cross sectional drawing of a block of FIG. 1.
Figure 4:
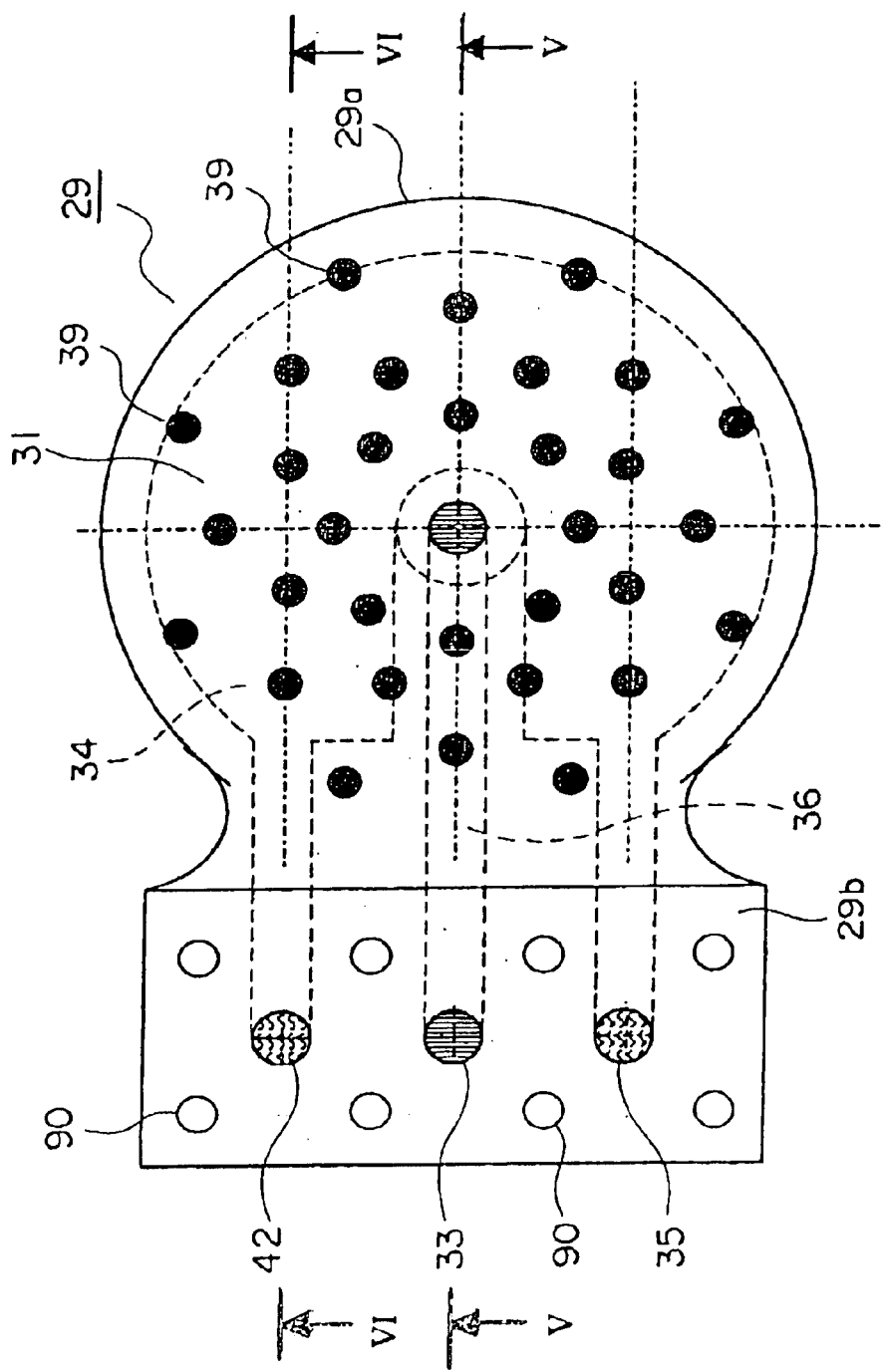
FIG. 4 is a plan view of a low voltage electrode of FIG. 1.
Figure 5:
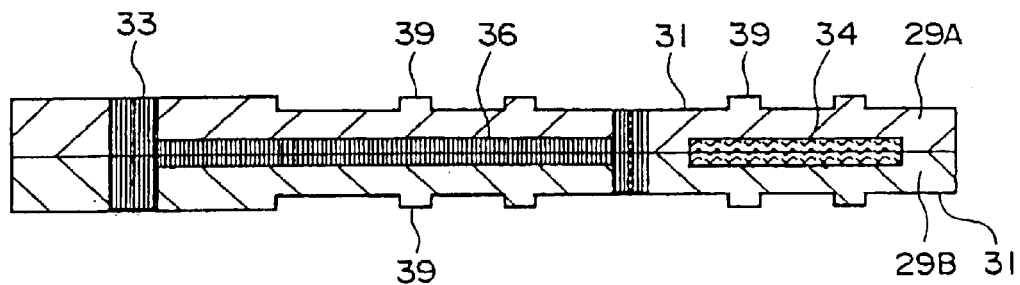
FIG. 5 is a cross sectional drawing of the low voltage electrode of FIG. 4 taken along the line V—V.
Figure 6:
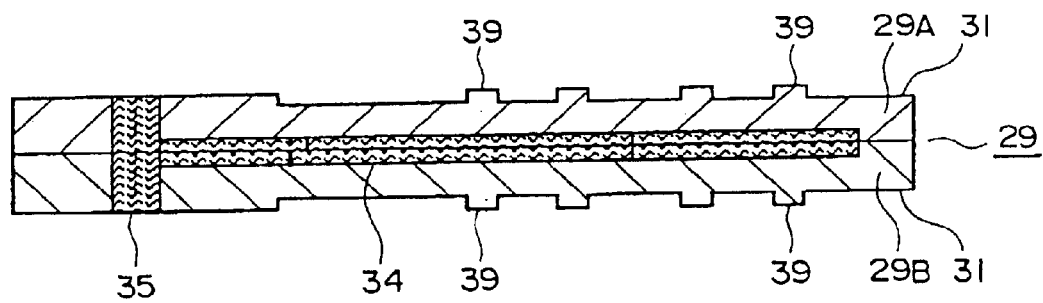
FIG. 6 is a cross sectional drawing of the low voltage electrode of FIG. 4 taken along the line VI—VI.

FIG. 1 is a diagram of an ozone generating apparatus including an ozonizer of Embodiment 1 of the present invention; FIG. 2 is a diagram of an inner portion of the ozonizer of FIG. 1 with the cover removed; FIG. 3 is a cross sectional drawing of a block of FIG. 1; FIG. 4 is a plan view of a low voltage electrode of FIG. 1; FIG. 5 is a cross sectional drawing of the low voltage electrode of FIG. 4 taken along the line V—V; and FIG. 6 is a cross sectional drawing of the low voltage electrode of FIG. 4 taken along the line VI—VI.

The ozone generating comprises an ozonizer 16, an ozone transformer 17 and an high frequency inverter 18.

The high frequency inverter 18 changes to a required frequency power input from a power source input 19, and the ozone transformer 17 increases this power to a voltage necessary for the ozonizer 16 and it is supplied as necessary power to the ozonizer 16. The high frequency inverter 18 further has the function of regulating current/voltage and controls a supplied power injection rate. High voltage supplied from the ozone transformer 17 is supplied to high voltage electrodes 8 in the ozonizer 16 from a high voltage cable 20 through a high voltage bushing 21. Moreover, the ozone transformer 17 is connected via a base 1 and a low voltage cable 24.

The ozonizer 16 comprises the base 1, discharge cells 28 laminated in a plurality of layers on the base 1, blocks 30 intervening between low voltage electrodes 29 of the discharge cells 28, first fastening bolts 14 passing through low voltage electrodes 29, blocks 30 and a block presser plate 37 and a tip portion thereof screwing into the base 1 for integrating the base 1, low voltage electrodes 29, blocks 30 and the block presser plate 37, and second fastening bolts 15 passing through an electrode presser plate 38 mounted on an uppermost low voltage electrode 29 and a tip portion thereof screwing into the base 1 for sandwiching and mounting laminated discharge cells 28 between the electrode presser plate 38 and the base 1. The second fastening bolts 15 pass through peripheral portions of the electrode presser plate 38 and do not pass through the discharge cells 28. Moreover, the reference numeral 90 in the drawings denotes through holes for the first fastening bolts 14.

The discharge cell 28 comprises the disk-shaped high voltage electrode 8 formed with a dielectric film 31 on a surface thereof facing a discharge gap 6, a disk-shaped dielectric 7 contacting both surfaces of the high voltage electrode 8, and the low voltage electrode 29 facing the dielectric 7 via the discharge gap 6. The dielectric 7 is constructed of glass or ceramic. The high voltage electrode 8 is made of a conductive thin sheet such as stainless steel plate and the like and an end portion thereof is connected to a feed terminal 32.

The low voltage electrode 29 comprises a low voltage electrode main body 29a and an extension 29b sandwiched by blocks 30. A coolant passage 34 is formed in each low voltage electrode main body 29a and extension 29b. A coolant inlet portion 42 and coolant outlet portion 35 passing through the blocks 30, the extensions 29b and the base 1 are formed at an end of each coolant passages 34. An ozone gas outlet portion 33 formed between the coolant inlet portion 42 and coolant outlet portion 35 passes through the blocks 30, the extensions 29b and the base 1, and is connected to an ozone gas passage 36. The coolant inlet portion 42, the coolant outlet portion 35 and the ozone gas outlet portion 33 are all formed on the same line. Moreover, in FIGS. 1 and 2, the coolant outlet portion 35 and ozone gas outlet portion 33 are shown staggered in order to show them passing through the blocks 30, the extensions 29b and the base 1.

Also, the low voltage electrode 29 is constructed from a first low voltage electrode portion 29A and a second low voltage electrode portion 29B. Convexoconcave processing of several mm for forming the ozone gas passage 36 and the coolant passage 34 is applied in advance by etching and the like in each of the low voltage electrode portions 29A, 29B, and hole processing for forming the ozone gas outlet portion 33, the coolant outlet portion 35 and the coolant inlet portion 42 is also applied in advance by etching and the like. Further, spacers 39 are provided formed by etching and the like at one side of the first low voltage electrode portion 29A and the second low voltage electrode portion 29B. The low voltage electrode 29 including the ozone gas passage 36, the ozone gas outlet portion 33, the coolant passage 34, the coolant outlet portion 35 and coolant inlet portion 42 is formed by joining the two (2) low voltage electrode portions 29A, 29B. A brazing method is used for joining of the two (2) low voltage electrode portions 29A, 29B, and heat joining is done in an oxygen free state.

When brazing joining is employed, ozone gas causes an oxidation reaction with brazing filler metal in the ozone gas passage 36 and ozone gas is decomposed, and metallic oxides are created and clean ozone may be damaged by metallic oxides mixing with the ozone gas.

In order to avoid such trouble, instead of brazing joining as a method of joining the low voltage electrode portions 29A, 29B, which are metal electrodes, the low voltage electrode portions 29A, 29B may be superposed with each other and the overlapping surfaces joined by heat and pressure only.

Moreover, packing (not shown) for sealing a coolant and ozone gas is intervened between the blocks 30 and the extensions 29b to maintain air-tightness in each of the coolant outlet portion 35, the coolant inlet portion 42 and the ozone gas outlet portion 33 of the low voltage electrode 29. Namely, as the blocks 30 and the extensions 29b are alternately laminated through the packing, are integrally joined by the first fastening bolts 14, the coolant and the ozone gas are sealed in.

Incidentally, the discharge gap length precision must be increased in order to improve an ozone generating efficiency, hence, a high precision is sought for a height of the discharge spacers 39 provided at both sides of the low voltage electrode main body 29a for setting the discharge gap length. The second fastening bolts 15 join integrally a plurality of laminated discharge cells, fastened by sufficient force to uniformly maintain the discharge gap 6 between the discharge cells 28. Also, in order that an adverse influence is not given to the precision of the discharge gap length, joining strength of the first fastening bolts 14 passing through the mutually laminated extensions 29b and blocks 30 are weaker than joining strength of the second fastening bolts 15 joining the mutually laminated the high voltage electrodes 8, the low voltage electrode main bodies 29a and the dielectrics 7.

Next, operation of the ozonizer 16 will be explained.

When an alternating voltage is applied between the low voltage electrode 29 and the high voltage electrode 8, a silent (dielectric barrier) discharge is produced by the discharge gap 6 and oxygen gas is passed from an entire periphery of the low voltage electrode main body 29a toward a center portion thereof and is converted and ozone gas is produced in the discharge gaps 6. This ozone gas is exhausted outside the ozonizer 16 from the ozone gas passage 36 and the ozone gas outlet portion 33.

When operating the ozonizer 16, cooling water as a coolant enters the coolant passage 34 from the coolant inlet portion 42 and, here, is exhausted outside the ozonizer 16 from the cooling water outlet portion 35 after cooling the low voltage electrode main body 29a. Accordingly, by at least cooling the low voltage electrode main body 29a, a gas temperature in the discharge gap 6 may be kept low and an ozone gas generating efficiency is increased.

Moreover, although cooling water is used as the coolant in the present embodiment, of course, the coolant is not limited thereto.

As stated above, in this ozonizer 16, oxygen gas enters the discharge gaps 6 from the entire periphery of the low voltage electrode main bodies 29a and flows toward a center portion thereof. In this course, the oxygen gas is converted to ozone gas, and this ozone gas is exhausted outside the ozonizer 16 via the ozone gas passages 36, an end of which meets with a central portion of the discharges gap 6, and the ozone gas outlet portion 33. Accordingly, since the oxygen gas flows at least a radial distance of the low voltage electrode main body 29a and it is exposed under the alternating high voltage for predetermined time, ozone gas generating efficiency and the like is prevented from being degraded by a so-called "short-pass".

Furthermore, the coolant inlet portion 42 for supplying coolant to the coolant passages 34, the coolant outlet portion 35 for exhausting coolant from the coolant passages 34 and the ozone gas outlet portion 33 connected to the ozone gas passages 36 formed in the low voltage electrodes 29 are each formed in the extensions 29b and blocks 30 passing through in the laminating direction of the discharge cells 28, and because the coolant inlet portion 42, the coolant outlet portion 35 and the ozone gas outlet portion 33 are all gathered at one side of the ozonizer 16, the ozonizer 16 may be made compact.

Also, since the coolant inlet portion 42, coolant outlet portion 35 and ozone gas outlet portion 33 are all generally formed on the same line, aligning is facilitated in an operation of laminating the discharge cells 28 and workability is improved.

Moreover, in accordance with the ozonizer of Embodiment 1 of the present invention, the low voltage electrode main bodies 29a and high voltage electrodes 8 are pressed to the base 1 by means of the electrode presser plate 38 and second fastening bolts 15, making uniform the discharge gap lengths between the discharge cells 28. The extensions 29b sandwiched by the blocks 30 are also pressed to the base 1 by means of the block presser plate 37 and first fastening bolts 14, the coolant and the ozone gas between each of discharge cells 28 are sealed in by the second fastening bolts 15, and brought together. These forces are divided between the discharge electrode side and the coolant and ozone gas meeting area. The force of the blocks 30 side is slightly weaker than that of the electrode side. Therefore, the pressing force of the blocks 30 side does not adversely affect the dimensional precision of the discharge gap length and a predetermined dimensional precision of the discharge gap length is maintained under conditions whereby the coolant and ozone gas meeting area is adequately sealed.

Embodiment 2

Figure 7:
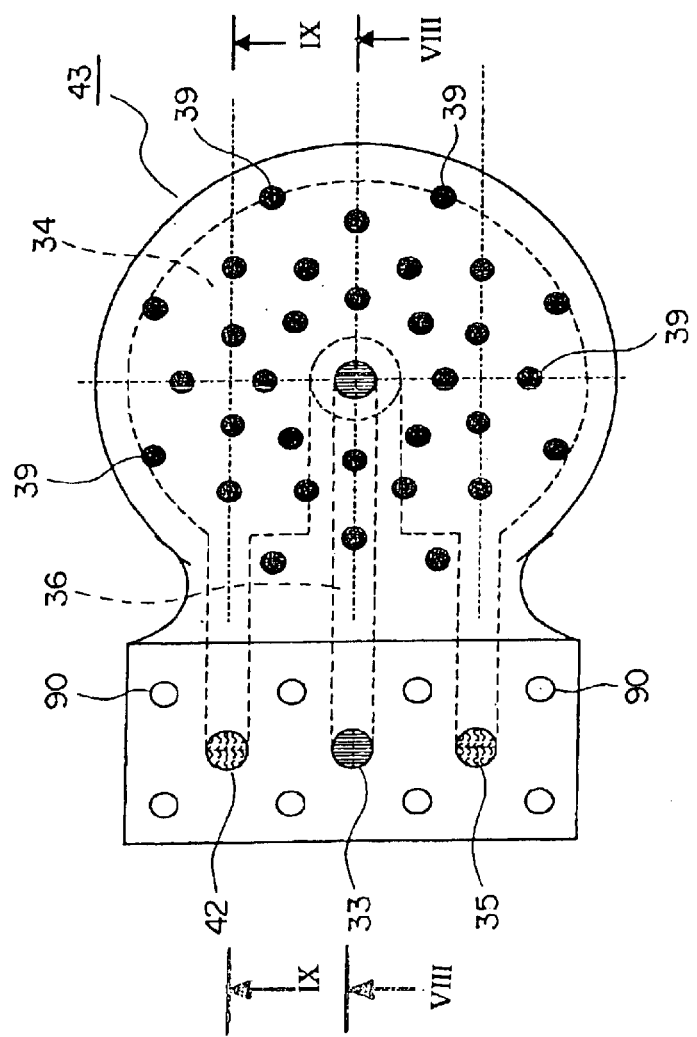
FIG. 7 is a plan view of a low voltage electrode of an ozonizer of Embodiment 2 of the present invention.
Figure 8:
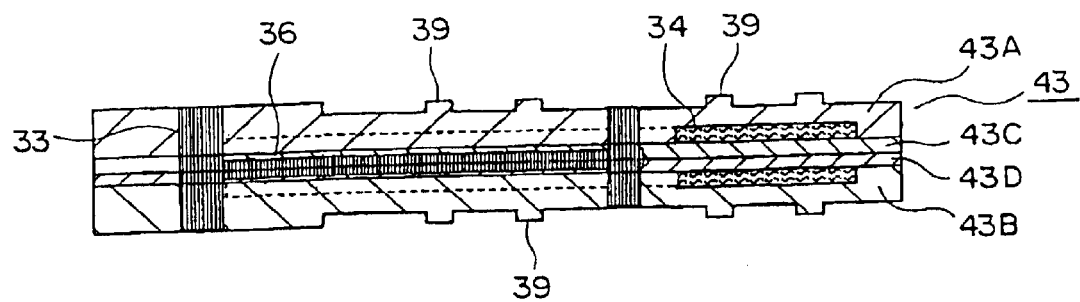
FIG. 8 is a cross sectional drawing of the low voltage electrode of FIG. 7 taken along the line VIII—VIII.
Figure 9:
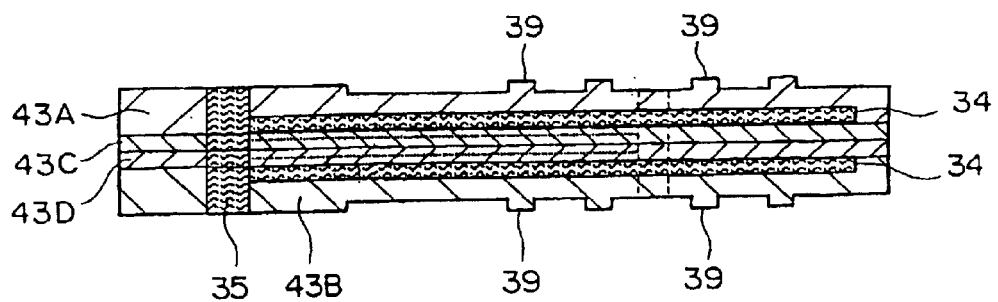
FIG. 9 is a cross sectional drawing of the low voltage electrode of FIG. 7 taken along the line IX—IX.

FIG. 7 is a plan view of a low voltage electrode 43 of an ozonizer 16 of Embodiment 2 of the present invention, FIG. 8 is a cross sectional drawing of the low voltage electrode 43 of FIG. 7 taken along the line VII—VII, FIG. 9 is a cross sectional drawing of the low voltage electrode 43 of FIG. 7 taken along the line IX—IX.

In the present embodiment, the low voltage electrode 43 comprises a first low voltage electrode portion 43A, a second low voltage electrode portion 43B, a third low voltage electrode portion 43C and a fourth low voltage electrode portion 43D. A convexoconcave portion of several mm for forming a coolant passage 34 is processed in advance by etching and the like in each of the first low voltage electrode portion 43A and a second low voltage electrode portion 43B, and holes for forming the ozone gas outlet portion 33, the coolant inlet portion 42 and the coolant outlet portion 35 are also processed in advance by etching and the like. A convexoconcave portion of several mm for forming an ozone gas passage 36 is processed in advance by etching and the like in each of the third low voltage electrode portion 43C and the fourth low voltage electrode portion 43D, and holes for forming the ozone gas outlet portion 33, the coolant inlet portion 42 and the coolant outlet portion 35 are also processed in advance by etching and the like. The low voltage electrode 43 including the ozone gas passage 36, the ozone gas outlet portion 33, the coolant passages 34, the coolant inlet portion 42 and the coolant outlet portion 35, is formed by joining together these four (4) low voltage electrode portions 43A to 43D. Also, at this time, the coolant passages 34 and ozone gas passage 36 are formed separate in different layers.

Moreover, other constructions are similar to Embodiment 1.

Thus, because coolant passages 34 are provided at an upper and lower side of the ozone gas passage 36, a surface area formed by the coolant passages 34 is increased approximately twofold and this alone improves the cooling characteristics of the ozone gas passage 36, and ozone decomposition caused by a temperature increase in the ozone gas passage 36 is suppressed and it is possible to derive highly concentrated ozone gas.

Moreover, three (3) low voltage electrode portions may also be superposed to form a low voltage electrode including coolant passages separated into two (2) layers and coolant passages and the ozone gas passage provided in different layers. Furthermore, it is also possible to form a low voltage electrode in which the coolant passages are separated into three (3) or more layers by laminating five (5) or more low voltage electrode portions.

Embodiment 3

Figure 10:
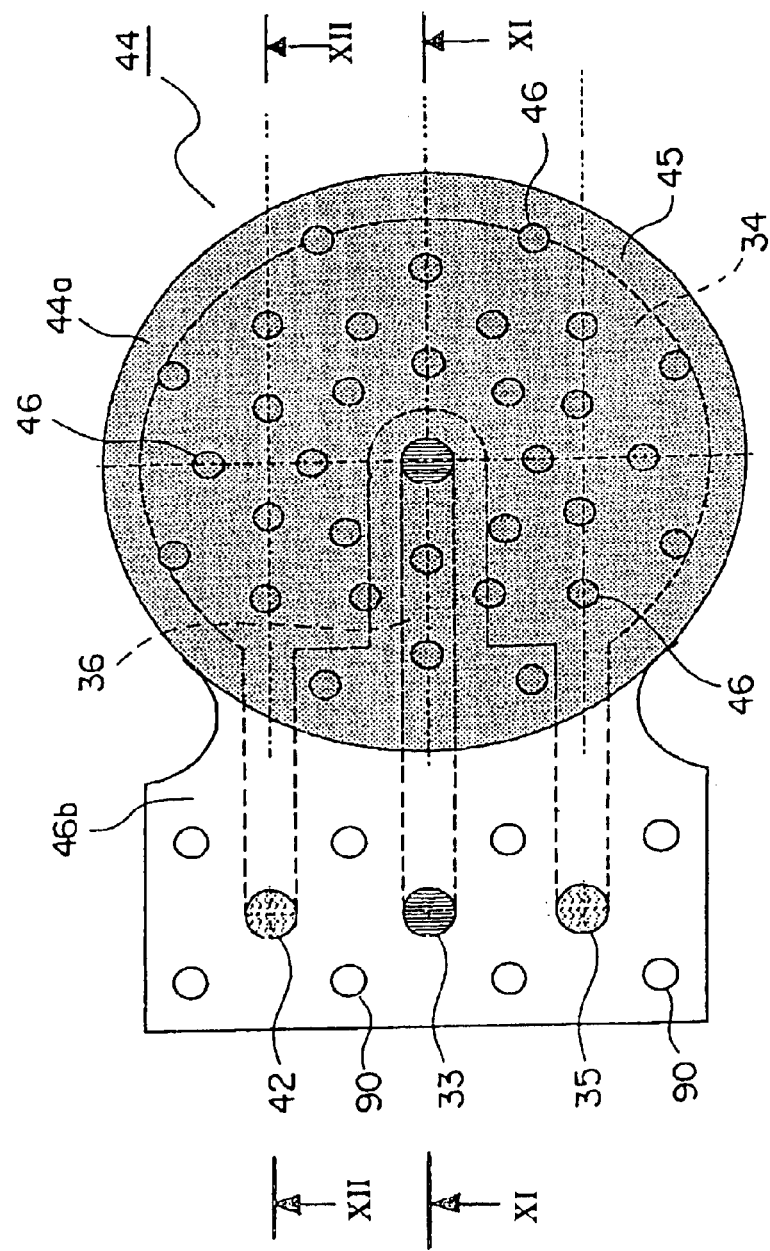
FIG. 10 is a plan view of a low voltage electrode of an ozonizer of Embodiment 3 of the present invention.
Figure 11:
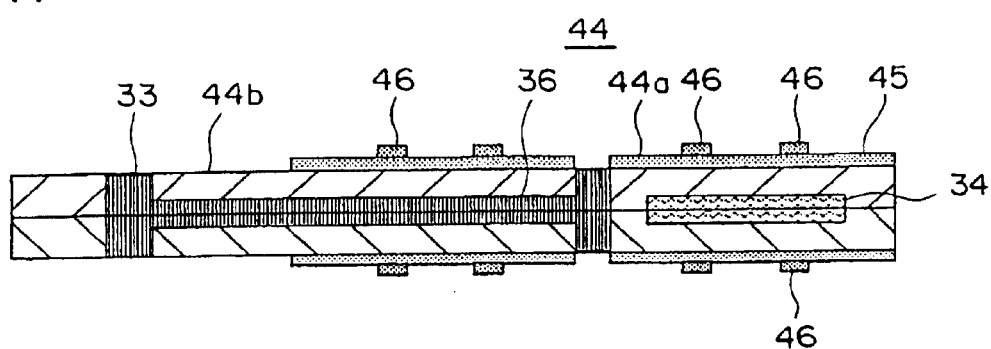
FIG. 11 is a cross sectional drawing of the low voltage electrode of FIG. 10 taken along the line XI—XI.
Figure 12:
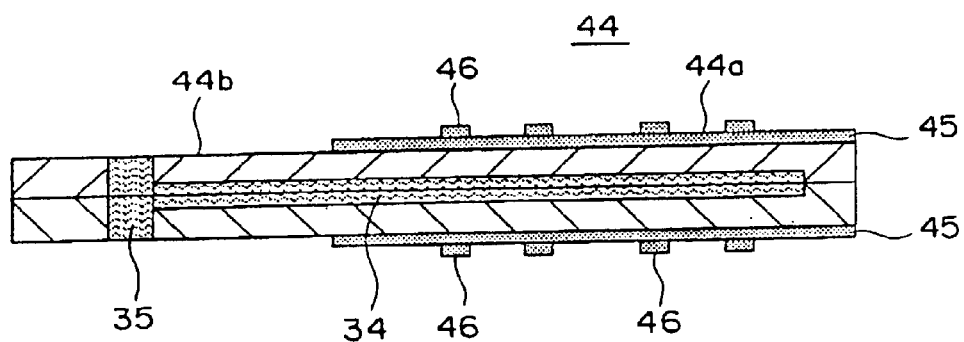
FIG. 12 is a cross sectional drawing of the low voltage electrode of FIG. 10 taken along the line XII—XII.

FIG. 10 is a plan view of a low voltage electrode 44 of an ozonizer of Embodiment 3 of the present invention, FIG. 11 is a cross sectional drawing of the low voltage electrode 44 of FIG. 10 taken along the line XI—XI and FIG. 12 is a cross sectional drawing of the low voltage electrode 44 of FIG. 10 taken along the line XII—XII.

In the present embodiment, ceramic is thermal sprayed onto both discharge surfaces of a low voltage electrode main body 44a of a low voltage electrode 44 to form a dielectric film 45, and ceramic is further thermal sprayed on the dielectric film 45 to form spacers 46.

Other constructions are similar to Embodiment 1.

In the present embodiment, the discharge surfaces of the low voltage electrode 44 are constructed of ceramic as a material of the dielectric film, they are not metal surfaces. Thus, metallic particles occurring due to sputtering from a metal surface in a discharge are not included in the ozone gas and a very clean ozone gas may be obtained.

Furthermore, by forming the dielectric film 45 of ceramic, a thermal conductivity of the low voltage electrode 44 is improved compared to a low voltage electrode with a discharge surface of stainless steel, and heat dissipating characteristics of the low voltage electrode 44 are improved, discharge electrode surfaces may be a lower temperature and it is possible to improve an ozone deriving efficiency.

Embodiment 4

Figure 13:
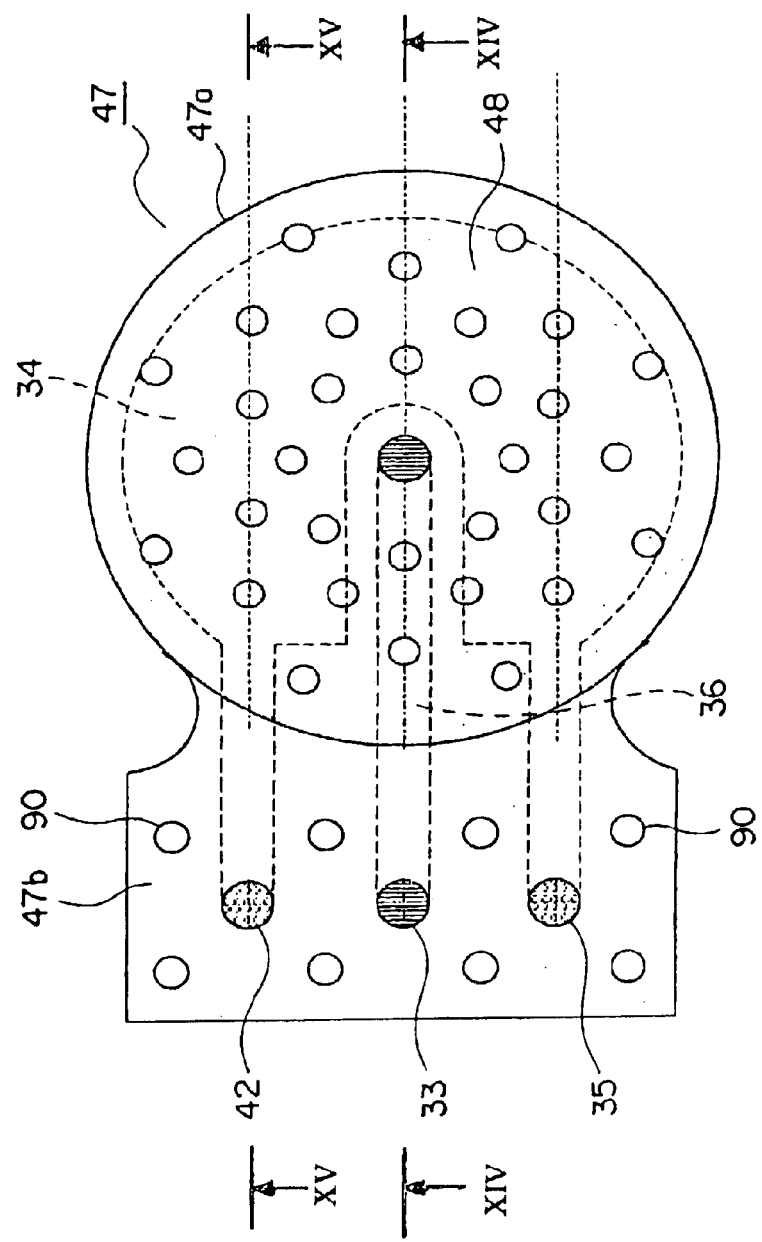
FIG. 13 is a plan view of a low voltage electrode of an ozonizer of Embodiment 4 of the present invention.
Figure 14:
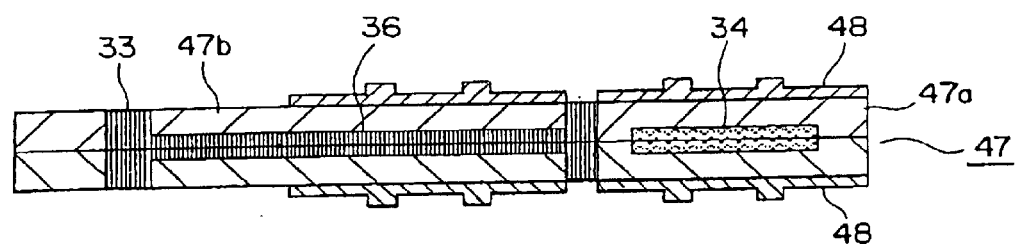
FIG. 14 is a cross sectional drawing of the low voltage electrode of FIG. 13 taken along the line XIV—XIV.
Figure 15:
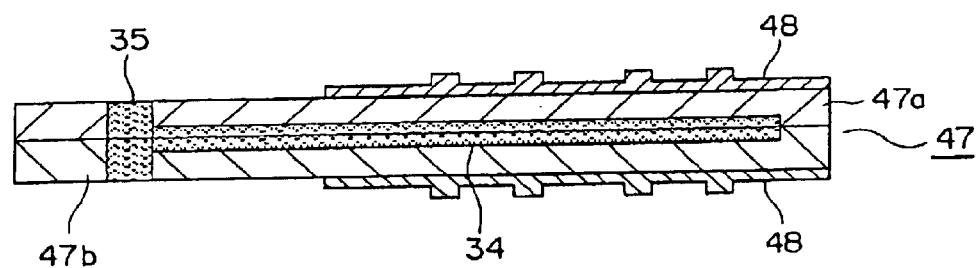
FIG. 15 is a cross sectional drawing of the low voltage electrode of FIG. 13 taken along the line XV—XV.

FIG. 13 is a plan view of a low voltage electrode 47 of an ozonizer 16 of Embodiment 4 of the present invention, FIG. 14 is a cross sectional drawing of the low voltage electrode 47 of FIG. 13 taken along the line XIV—XIV and FIG. 15 is a cross sectional drawing of the low voltage electrode 47 of FIG. 13 taken along the line XV—XV.

In the present embodiment, a point which differs from Embodiment 3 is that a glass dielectric 48 with spacers is adhered to both surfaces of a low voltage electrode main body 47a of the low voltage electrode 47.

Accordingly, a metal surface is eliminated at the discharge surface, and by providing the glass dielectric 48 which is a dielectric sheet, the present embodiment is similar to Embodiment 3 in that metallic particles occurring due to sputtering from a metal surface in a discharge are not included in the ozone gas and an extremely clean ozone gas may be obtained.

Also, a cost of the glass dielectric 48 may be reduced compared to that of the dielectric film 45 formed by ceramic thermal sputtering, and it is possible to form a thin glass film.

Embodiment 5

Figure 16:
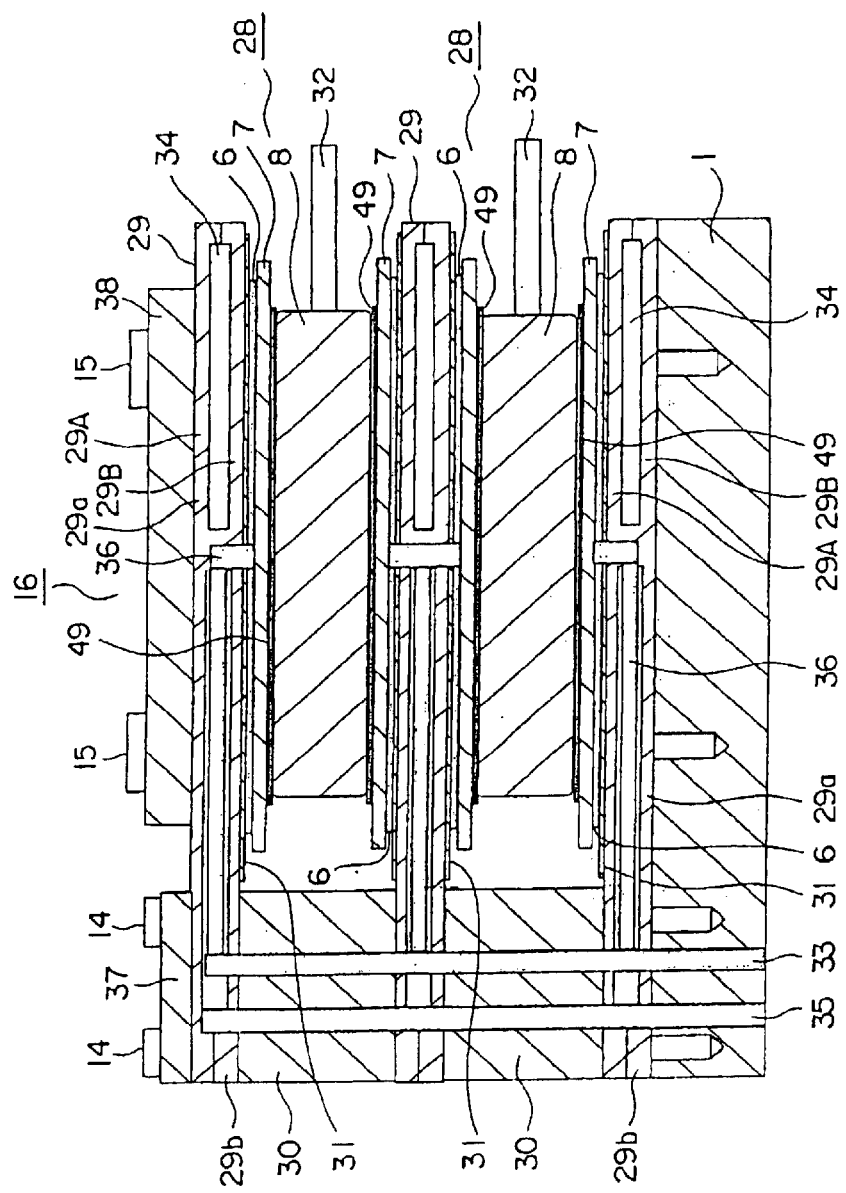
FIG. 16 is a diagram of an essential portion of an ozone generating apparatus of Embodiment 5 of the present invention.

FIG. 16 is a cross sectional drawing of an ozonizer 16 of Embodiment 5 of the present invention. The present embodiment differs from Embodiment 1 in that a conductive film 49 is formed on a surface of the dielectric 7 at the high voltage electrode 8 side.

In the above mentioned Embodiments 1 to 4, a surface of the metal high voltage electrode 8 and a surface of the dielectric 7 constructed of glass are contacted by mechanical pressure and a gap may develop in a portion of the contact surfaces and an improper discharge (local discharge) occurs in this gap which damages the dielectric 7, degrades a cooling effect of the high voltage electrode 8 by improper discharge, produces metallic contamination and degrades the ozone generating efficiency.

However, in the present embodiment, the conductive film 49 of an ozone resistant metal, for example, copper or gold and the like, is formed by being applied in advance so as to be completely adhered to the surface of the dielectric 7 at the high voltage electrode 8 side. Hence, even if a gap develops in one portion of the contact surfaces, since the conductive film 49 and the high voltage electrode 8 have the same electric potential, an improper discharge (local discharge) does not occur, the dielectric 7 is not damaged and a cooling effect of the high voltage electrode 8 is not degraded by an improper discharge, metallic contamination is not produced and degradation of the cooling effect of the high voltage electrode 8 is eliminated, and it is possible to prevent degradation of the ozone generating efficiency.

In the present embodiment, a conductive film 49 is formed on a surface of the dielectric 7 contacted to a high voltage electrode 8. However, in the case of an ozonizer where a dielectric is contacted to a low voltage electrode, a conductive film and the low voltage electrode have the same electric potential by forming the conductive film on the surface of the dielectric contacted to the low voltage electrode. Hence, even if a gap develops in one portion of the contact surfaces between the conductive film and the low voltage electrode, an improper discharge (local discharge) does not occur between the conductive film and the low voltage electrode, degradation of the dielectric, production of metallic contamination and degradation of ozone generating efficiency are prevented.

Embodiment 6

Figure 17:
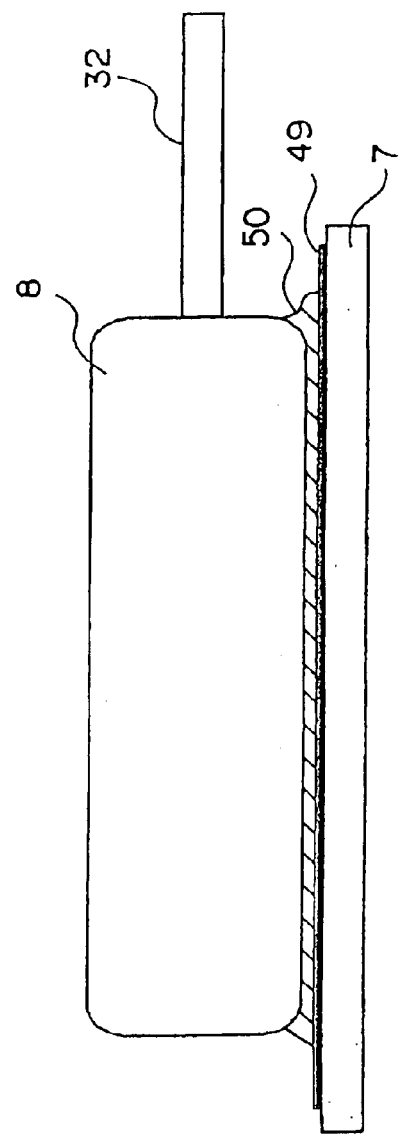
FIG. 17 is a front view of a high voltage electrode of an ozonizer of Embodiment 6 of the present invention.

FIG. 17 is a cross sectional drawing of an essential portion of an ozonizer 16 of Embodiment 6 of the present invention. In the case of Embodiment 5 where the dielectric 7 having the conductive film 49 on a surface thereof is tightly pressed to the high voltage electrode 8, a cooling capability is degraded when a contact electricity resistance and a contact heat resistance are large between the dielectric 7 and high voltage electrode 8.

In the present embodiment, because a silicon compound 50 having high electric conduction and thermal conduction and excellent ozone resistance characteristics is applied between the high voltage electrode 8 and conductive film 49, the contact electricity resistance and contact heat resistance are made small between the dielectric 7 and high voltage electrode 8, the cooling capability is improved, and it is possible to generate further highly concentrated ozone gas.

Moreover, instead of the compound 50, electric conduction and thermal conduction may also be increased by sandwiching an extremely thin metallic foil between the dielectric 7 and high voltage electrode 8.

Further, in the case of an ozonizer in which the dielectric is integrated with the low voltage electrode, a compound of good thermal conductivity and electrical conductivity may also be provided between the dielectric and low voltage electrode.

Embodiment 7

Figure 18:
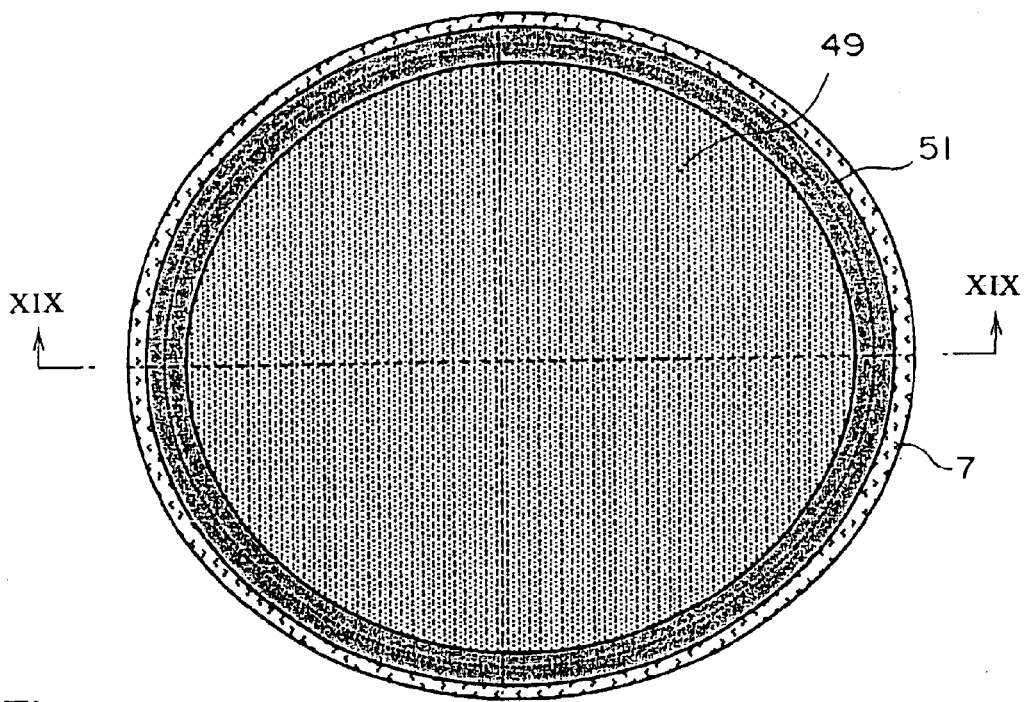
FIG. 18 is a plan view of a dielectric of an ozonizer of Embodiment 7 of the present invention.
Figure 19:
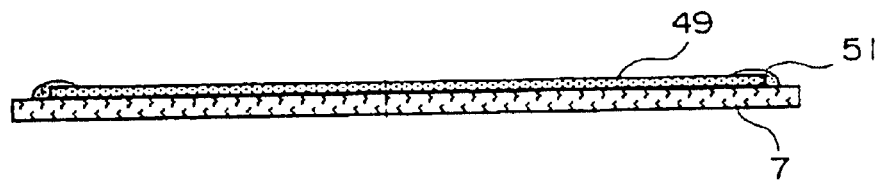
FIG. 19 is a cross sectional drawing of the dielectric of FIG. 18 taken along the line XIX—XIX.

FIG. 18 is a plan view of a dielectric of an ozonizer of Embodiment 7 of the present invention, FIG. 19 is a cross sectional drawing of taken along the line XIX—XIX in FIG. 18.

In the case of Embodiment 6, since the conductive film 49 of copper, for example, is formed at the high voltage electrode 8 side surface of the dielectric 7, a high voltage potential is applied to the conductive film 49 in surface contact with the high voltage electrode 8 and a corona discharge occurs at an edge portion between a circumferential fringe portion of the conductive film 49 and a circumferential fringe portion of the dielectric 7, and there is a concern that this will cause metallic contamination. In the present embodiment, an insulation maintaining film 51 is coated on the edge portion at the circumferential fringe portion of the conductive film 49. Thus, the occurrence of the corona discharge at the edge portion is prevented and it is possible to prevent the occurrence of metallic contamination.

Moreover, in the ozonizer 16, high voltage is fed to the high voltage electrode 8 from a feed terminal 32 and a silent discharge is generated between the conductive film 49 and the low voltage electrode 44 via the dielectric 7. At this time, in a case where an outside diameter of the conductive film 49 is smaller than an outside diameter of the high voltage electrode 8, a discharge occurs between a circumferential fringe portion of the dielectric 7 and a circumferential fringe portion of the high voltage electrode 8, and this becomes a cause of metallic contamination.

Conversely, by making the outside diameter of the conductive film 49 larger than that of the high voltage electrode 8 and further increasing the outside diameter of the dielectric 7, the discharge is eliminated between the circumferential fringe portion of the dielectric 7 and the circumferential fringe portion of the high voltage electrode 8 and metallic contamination may be prevented.

Embodiment 8

Figure 20:
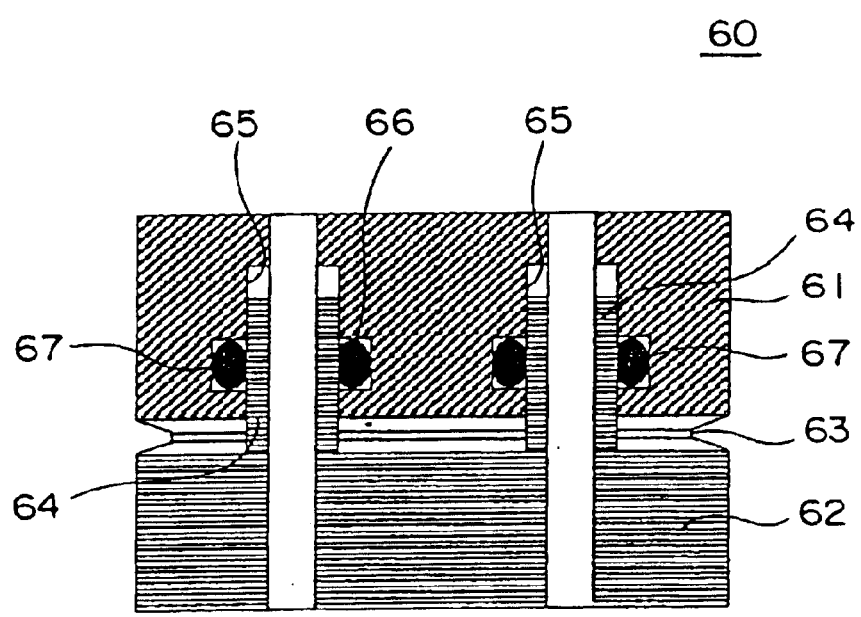
FIG. 20 is a cross sectional drawing of a block of an ozonizer of Embodiment 8 of the present invention.

FIG. 20 is a cross sectional drawing of a block 60 of an ozonizer of Embodiment 8 of the present invention, and a block 60 is used instead of the block 30 of Embodiment 1. All other constructions are the same as in Embodiment 1.

The block 60 comprises a first block portion 61, a second block portion 62 and a disc spring 63, being an elastic body, intervening between the first block portion 61 and second block portion 62. Concave portions 65 are formed in the first block portion 61 for fitting protruding portions 64 of the second block portion 62. Moreover, groove portions 67 are formed in the first block portion 61 for fitting an O-rings 66.

In the present embodiment, because it is necessary it increase the discharge gap length precision, a height precision of spacers in the discharge gaps is improved and an entirety of electrodes is pressingly mounted to the base 1 by means of the electrode presser plate 38 and the second fastening bolts 15 to thereby improve the discharge gap length precision. Also, extensions 29b sandwiched between the blocks 60 are also pressingly mounted to the base 1 by means of the block presser plate 37 and the first fastening bolts 14, but this pressing force is slightly weaker than the pressing force of the entirety of electrodes so as to not adversely affect the discharge gap length precision.

In particular, by intervening the disc spring 63 between the first block portion 61 and second block portion 62 to make the block 60 an elastic construction, the pressing force of the block 60 side may be made reliably weaker than the pressing force of the electrode side, and it is possible to further improve the discharge gap length precision.

Embodiment 9

Figure 21:
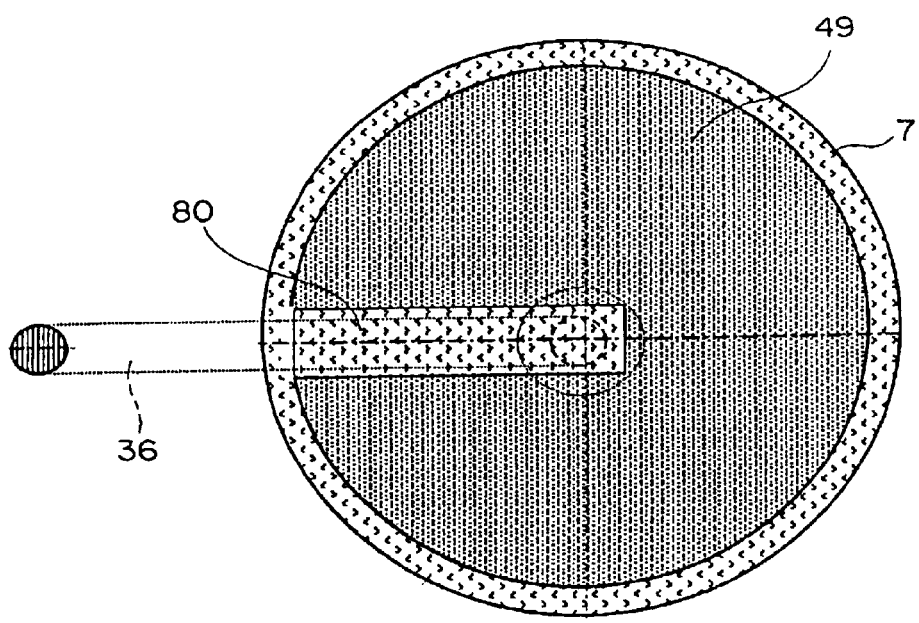
FIG. 21 is a plan view of a dielectric of an ozonizer of Embodiment 9 of the present invention.

FIG. 21 is a plan view of a dielectric 7 of an ozonizer 16 of Embodiment 9 of the present invention.

As opposed to the dielectric 7 of Embodiment 7 in which the conductive film 49 is formed on the entire surface of the dielectric 7 except the circumferential portion, the dielectric 7 of the present embodiment includes a removed region 80 in which the conductive film 49 is removed at a location facing the ozone gas passage 36 extending radially from a central portion in the low voltage electrode 29.

Accordingly, the conductive film 49 in surface contact with the high voltage electrode 8 is of the same electric potential as the high voltage electrode 8, and a discharge occurs at a corresponding location between dielectric 7 and low voltage electrode 29, but not at any other location. Consequently, because a discharge does not occur between the high voltage electrode 8 and a location of the dielectric 7 corresponding to the ozone gas passage 36, it is possible to derive a further highly concentrated ozone gas.

That is to say, when a discharge occurs on a surface of the low voltage electrode 29 corresponding to the ozone gas passage 36 of the low voltage electrode 29, the ozone gas passage 36 is heated by a discharge heat, and, because ozone gas is decomposed by heat, ozone is decomposed in the ozone gas passage 36 and there is a problem in that highly concentrated ozone cannot be derived. However, in accordance with the present embodiment, ozone decomposition may be suppressed.

Embodiment 10

Figure 22:
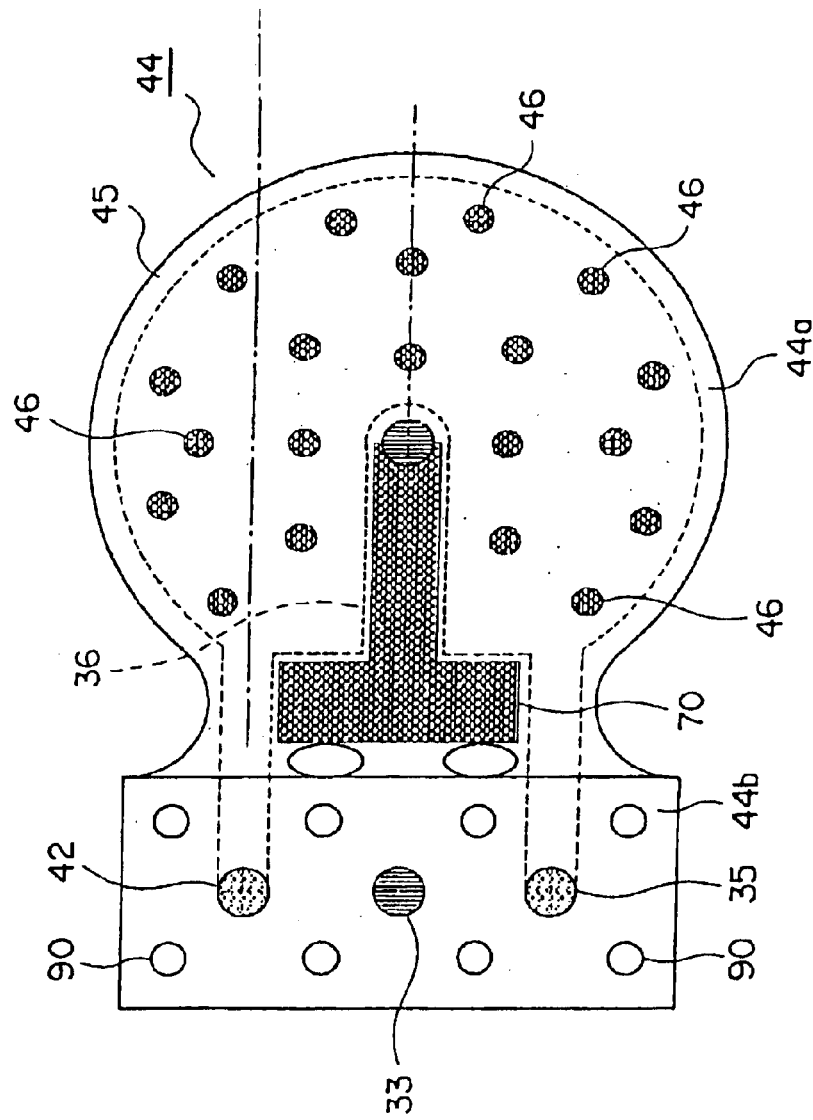
FIG. 22 is a plan view of a low voltage electrode of an ozonizer of Embodiment 10 of the present invention.

FIG. 22 is a plan view of a low voltage electrode 44 of an ozonizer 16 of Embodiment 10 of the present invention. In the present embodiment, in the low voltage electrode 44 of Embodiment 4, a T-shaped spacer covering 70 is further formed on a surface of the low voltage electrode 44 corresponding to the ozone gas passage 36.

By forming this T-shaped spacer covering 70, a discharge does not occur at the surface of the low voltage electrode 44 corresponding to the ozone gas passage 36 and it is possible to derive a further highly concentrated ozone gas for the same reason as Embodiment 9.

Embodiment 11

Figure 23:
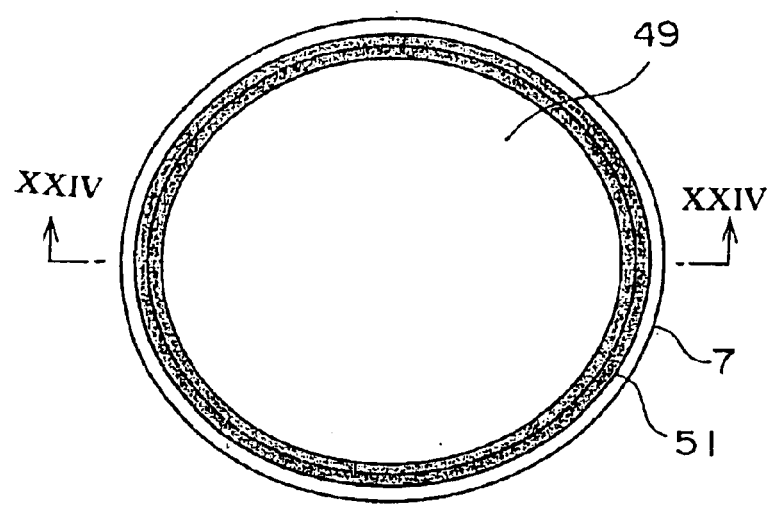
FIG. 23 is a plan view of a dielectric of an ozonizer of Embodiment 11 of the present invention.
Figure 24:
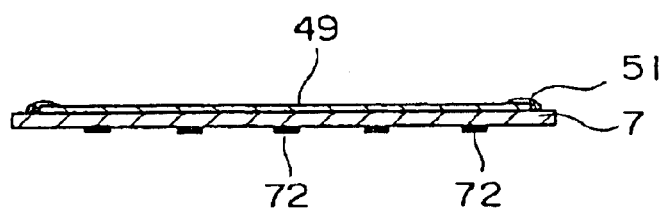
FIG. 24 is a cross sectional drawing of the dielectric of FIG. 23 taken along the line XXIV—XXIV.
Figure 25:
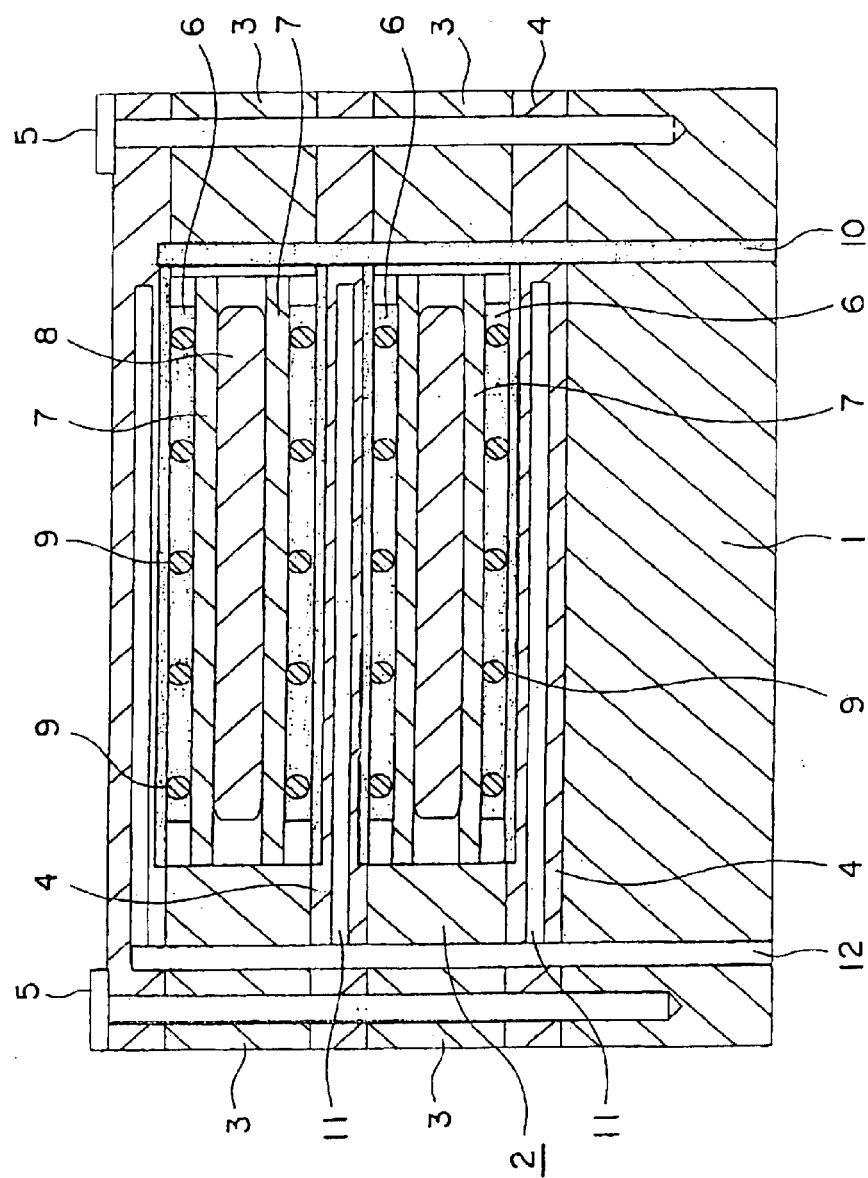
FIG. 25 is a diagram of a conventional ozonizer.

FIG. 23 is a plan view of a dielectric 7 of an ozonizer 16 of Embodiment 11 of the present invention and FIG. 24 is a cross sectional drawing of the dielectric 7 of FIG. 23 taken along the line XIV—XIV.

Although in each of the above embodiments spacers 39, 46 are formed in respective low voltage electrodes 29, 43, 44, 47, in the present embodiment, spacers 72 are formed on a surface of the dielectric 7 facing a low voltage electrode 71 via the discharge gap 6.

When adopting a construction in which the low voltage electrodes 29, 43, 44, 47 and spacers 39, 46 are integrated, a manufacturing process is needed for the low voltage electrodes 29, 43, 44, 47 to form the spacers 39, 46 and the manufacturing process of the low voltage electrodes 29, 43, 44, 47 becomes complicated and the cost increases. In contrast, when the spacers 72 are formed on the surface of the dielectric 7, because the dielectric 7 itself is lightweight and the spacers 72 are formed on only one surface of the dielectric 7, the process for forming the spacers 72 is simplified.

Moreover, although each of the above embodiments has been described for the case where the dielectric 7 is contacted to the high voltage electrode 8, an ozonizer in which a dielectric is contacted to the low voltage electrode may also be applied in the present invention.

As described above, in the ozonizer of the present invention, oxygen gas enters the discharge gaps from the entire periphery of the low voltage electrode main body and flows toward a center portion thereof. In this course, the oxygen gas is converted to ozone gas, and this ozone gas is exhausted outside the ozonizer via the ozone gas passage, an end of which meets with a central portion of the discharge gap, and the ozone gas outlet portion. Accordingly, since the oxygen gas flows over at least a radial distance of the low voltage electrode main body and it is exposed under the alternating high voltage for predetermined time, ozone gas generating efficiency and the like is prevented from being degraded by a so-called "short-pass".

Also, because the coolant inlet portion, coolant outlet portion and zone gas outlet portion are all gathered at one side of the ozonizer, the ozonizer may be made compact.

According to another aspect of the present invention there is provided an ozonizer wherein, alternately laminated extensions and blocks are joined by means of a first fastening bolt passing through the extensions and the blocks, a tip portion thereof screwing into the base, alternately laminated high voltage electrodes, low voltage electrode main bodies and dielectrics are joined by means of a sandwiching and mounting force of a second fastening bolt, passing through an electrode presser plate mounted on an uppermost low voltage electrode and a tip portion thereof screwing into the base, acting between the electrode presser plate and the base, and a joining force of the first fastening bolt is a force required to join the extensions and the block without a gap, a joining force of the second fastening bolt is the sandwiching force required to maintain a discharge gap length uniformly, the joining force of the first fastening bolts is weaker than the joining force of the second fastening bolt. Thus, the pressing force of the block side does not adversely affect the discharge gap length precision and a predetermined precision of the discharge gap length may be maintained.

According to yet another aspect of the present invention there is provided an ozonizer wherein, the coolant inlet portion, the coolant outlet portion and the ozone gas outlet portion are generally formed on a same line. Hence, aligning is facilitated in an operation of laminating the discharge cells and workability is improved.

According to yet another aspect of the present invention there is provided an ozonizer wherein, the low voltage electrode comprises a first low voltage electrode portion having a convexoconcave surface at one side thereof and a second low voltage electrode portion having a convexoconcave surface at one side thereof, and the convexoconcave surface of the first low voltage electrode portion and the convexoconcave surface of the second low voltage electrode portion are contacted to form the coolant passage and the ozone gas passage. Thus, the coolant passage and ozone gas passage are easily formed by joining the first low voltage electrode portion and the second low voltage electrode portion.

According to yet another aspect of the present invention there is provided an ozonizer wherein, the low voltage electrode comprises a first low voltage electrode portion having a convexoconcave surface at one side thereof and a second low voltage electrode portion having a convexoconcave surface at one side thereof and a third low voltage electrode portion intervening between the first low voltage electrode portion and the second low voltage electrode portion, and coolant passages are formed separately in different layers by superposing the first low voltage electrode portion, the second low voltage electrode portion and the third low voltage electrode portion. Thus, a surface area formed by the coolant passages is increased approximately twofold and this alone improves the cooling characteristics of the ozone gas passage, and ozone decomposition caused by a temperature increase in the ozone gas passage is suppressed and it is possible to derive highly concentrated ozone gas.

According to yet another aspect of the present invention there is provided an ozonizer wherein, the low voltage electrode portions are joined together by heat and pressure only, a brazing filler metal is not used. Hence, the trouble occurring when brazing joining is employed, i.e., ozone gas causes an oxidation reaction with brazing filler metal in the ozone gas passage and ozone gas is decomposed, and metallic oxides are created and clean ozone may be damaged by metallic oxides mixing with the ozone gas, does not occur.

According to yet another aspect of the present invention there is provided an ozonizer wherein, a spacer covering is provided at a surface of the low voltage electrode corresponding to the ozone gas passage. Thus, a discharge does not occur on the surface of the low voltage electrode corresponding to the ozone gas passage and the ozone gas passage is not heated by discharge heat, ozone gas decomposition is suppressed, and it is possible to derive a highly concentrated ozone gas.

According to yet another aspect of the present invention there is provided an ozonizer wherein, a surface of the low voltage electrode facing the discharge gap is covered with a dielectric film. Thus, metallic particles occurring due to sputtering from a metal surface in a discharge are not included in the ozone gas and a very clean ozone gas may be obtained.

According to yet another aspect of the present invention there is provided an ozonizer wherein, a dielectric sheet having spacers is adhered to the surface of the low voltage electrode facing the discharge gap. Hence, low cost, clean ozone gas may be obtained.

According to yet another aspect of the present invention there is provided an ozonizer wherein, the dielectric film, dielectric sheet is ceramic or glass containing a $S_iO_2$ component. Thus, a thermal conductivity of the low voltage electrode is improved compared to a low voltage electrode with a discharge surface of, for example, stainless steel, and heat dissipating characteristics of the low voltage electrode are improved, discharge electrode surfaces may be a lower temperature and it is possible to improve an ozone deriving efficiency.

According to yet another aspect of the present invention there is provided an ozonizer wherein, a conductive film is provided on a surface of the dielectric contacting the low voltage electrode or the high voltage electrode. Hence, the conductive film and the high voltage electrode have the same electric potential, an improper discharge (local discharge) does not occur, the dielectric is not damaged and a cooling effect of the high voltage electrode is not degraded by an improper discharge, metallic contamination is not produced and degradation of the cooling effect of the high voltage electrode is eliminated, and it is possible to prevent degradation of the ozone generating efficiency.

According to yet another aspect of the present invention there is provided an ozonizer wherein, the conductive film provided on the surface of the dielectric contacting the high voltage electrode includes a removed region where the conductive film is removed at a region corresponding to the ozone passage. Thus, the conductive film in surface contact with the high voltage electrode is of the same electric potential as the high voltage electrode, and a discharge occurs at a corresponding location between dielectric and low voltage electrode, but not at any other location. Consequently, because a discharge does not occur between the high voltage electrode and a location of the dielectric corresponding to the ozone gas passage, it is possible to derive a further highly concentrated ozone gas.

According to yet another aspect of the present invention there is provided an ozonizer wherein, a compound of good thermal conductivity and good electric conductivity is provided between the dielectric and the high voltage electrode or the low voltage electrode integrated with the dielectric. Thus, the contact electricity resistance and contact heat resistance are made small between the dielectric and high voltage electrode, the cooling capability is improved, and it is possible generate further highly concentrated ozone gas.

According to yet another aspect of the present invention there is provided an ozonizer wherein, a circumferential fringe of the dielectric film is covered with an insulation maintaining film. Hence, the occurrence of the corona discharge at the edge portion is prevented and it is possible to prevent the occurrence of metallic contamination.

According to yet another aspect of the present invention there is provided an ozonizer wherein, a spacer is provided on one surface of the dielectric. Thus, the spacer is formed on only one surface of the lightweight dielectric and the process for forming the spacer is simplified.

According to yet another aspect of the present invention there is provided an ozonizer wherein, an outside diameter dimension of the high voltage electrode is smaller than an outside diameter dimension of the dielectric. Hence, the discharge may be prevented between the circumferential fringe portion of the dielectric and the circumferential fringe portion of the high voltage electrode and metallic contamination may be prevented.

According to still yet another aspect of the present invention there is provided an ozonizer wherein, the block comprises a first block portion, a second block portion fitted in the first block portion and an elastic body provided between the first block portion and the second block portion. Thus, the pressing force of the block side may be made reliably weaker than the pressing force of the electrode side, and it is possible to further improve the discharge gap length precision.

What is claimed is:

1. An ozonizer comprising:
a plurality of discharge cells, each discharge cell comprising a disk-shaped high voltage electrode, a low voltage electrode facing the high voltage electrode via a discharge gap and including a coolant passage at an inner portion thereof, a dielectric contacting one of said high voltage electrode and said low voltage electrode and a spacer provided in said discharge gap for maintaining said discharge gap, said discharge cells being laminated in a plurality of layers, wherein when an alternating voltage is applied between said high voltage electrode and said low voltage electrode and causes a discharge in said discharge gap, oxygen gas passing inside said discharge gap from a peripheral portion of said high voltage electrode toward a central portion of said discharge gap is converted to ozone gas, and the ozone gas is led to an ozone gas passage, an end of the gas ozone passage meeting with said central portion of said discharge gap and extending in a radial direction inside said low voltage electrode, said low voltage electrode comprising a disc-shaped low voltage electrode main body facing said high voltage electrode and an extension provided at one side of said low voltage electrode main body, extensions of a plurality of said low voltage electrode are laminated in a plurality of layers on a base via a blocks; and a coolant inlet portion for supplying coolant to said coolant passage, a coolant outlet portion for exhausting coolant from said coolant passage, and an ozone gas outlet portion for exhausting ozone gas from said ozone gas passage, passing through said extensions and said blocks, respectively, in a laminating direction of said discharge cells.

2. The ozonizer according to claim 1 wherein said extensions and said blocks are alternately laminated and joined by a first fastening bolt passing through said extensions and said blocks, a tip portion of said first fastening bolt threadedly engaging said base, and said high voltage electrode, said low voltage electrode main body, and said dielectric are alternately laminated and joined by a second fastening bolt, passing through an electrode presser plate mounted on an uppermost low voltage electrode, a tip portion of said second fastening bolt threadedly engaging said base, and acting between said electrode presser plate and said base, wherein a joining force of said first fastening bolt is a force required to join said extensions and said block without a gap, a joining force of said second fastening bolt is a sandwiching force required to maintain a discharge gap length uniformly, and said joining force of said first fastening bolt is weaker than said joining force of said second fastening bolt.

3. The ozonizer according to claim 1 wherein said coolant inlet portion, said coolant outlet portion and said ozone gas outlet portion are generally aligned.

4. The ozonizer according to claim 1 wherein said low voltage electrode comprises a first low voltage electrode portion having a convexoconcave surface at one side and a second low voltage electrode portion having a convexoconcave surface at one side, and said convexoconcave surface of said first low voltage electrode portion and said convexoconcave surface of said second low voltage electrode portion are in contact and form said coolant passage and said ozone gas passage.

5. The ozonizer according to claim 1 wherein said low voltage electrode comprises a first low voltage electrode portion having a convexoconcave surface at one side and a second low voltage electrode portion having a convexoconcave surface at one side and a third low voltage electrode portion intervening between said first low voltage electrode portion and said second low voltage electrode portion, and said coolant passages are formed separately in different layers by superposing said first low voltage electrode portion, said second low voltage electrode portion, and said third low voltage electrode portion.

6. The ozonizer according to claim 1 wherein each of said first low voltage electrode portion, said second low voltage electrode portion, and said third low voltage electrode portion is joined together by heat and pressure only.

7. The ozonizer according to claim 1 including a spacer covering, located at a surface of said low voltage electrode corresponding to said ozone gas passage.

8. The ozonizer according to claim 1 wherein a surface of said low voltage electrode facing said discharge gap is covered with a dielectric film.

9. The ozonizer according to claim 1 wherein a dielectric sheet including said spacer is adhered to a surface of said low voltage electrode facing said discharge gap.

10. The ozonizer according to claim 8 wherein said dielectric film is ceramic or glass containing a $SiO_2$ component.

11. The ozonizer according to claim 9 wherein said dielectric sheet is ceramic or glass containing a $SiO_2$ component.

12. The ozonizer according to claim 1 wherein a conductive film is located on a surface of said dielectric contacting said low voltage electrode or said high voltage electrode.

13. The ozonizer according to claim 12 wherein said conductive film on said surface of said dielectric, contacting said high voltage electrode, includes a region corresponding to said ozone passage where said conductive film is removed.

14. The ozonizer according to claim 1 wherein a compound having good thermal conductivity and good electrical conductivity is located between said dielectric and said high voltage electrode or said low voltage electrode integrated with said dielectric.

15. The ozonizer according to claim 12 wherein a circumferential fringe of said conductive film is covered with an insulation maintaining film.

16. The ozonizer according to claim 1 wherein said spacer is provided on one surface of said dielectric.

17. The ozonizer according to claim 1 wherein an outside diameter dimension of said high voltage electrode is smaller than an outside diameter dimension of said dielectric.

18. The ozonizer according to claim 1 wherein each of said block comprises a first block portion, a second block portion fitted in said first block portion, and an elastic body located between said first block portion and said second block portion.

* * * * *